(12) United States Patent
Siomina et al.

(10) Patent No.: US 10,278,104 B2
(45) Date of Patent: Apr. 30, 2019

(54) METHOD, APPARATUS AND COMPUTER PROGRAM FOR CELL IDENTIFICATION

(71) Applicant: Telefonaktiebolaget LM Ericsson (publ), Stockholm (SE)

(72) Inventors: Iana Siomina, Solna (SE); Bengt Lindoff, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 99 days.

(21) Appl. No.: 15/454,361

(22) Filed: Mar. 9, 2017

(65) Prior Publication Data
US 2017/0188277 A1    Jun. 29, 2017

Related U.S. Application Data

(63) Continuation of application No. 13/755,411, filed on Jan. 31, 2013.
(Continued)

(51) Int. Cl.
*H04W 36/04* (2009.01)
*H04W 36/18* (2009.01)
(Continued)

(52) U.S. Cl.
CPC ....... *H04W 36/18* (2013.01); *H04W 36/0083* (2013.01); *H04W 36/00835* (2018.08); *H04W 36/04* (2013.01); *H04W 84/045* (2013.01)

(58) Field of Classification Search
CPC ..... H04W 36/00–36/385; H04W 12/00–12/12
(Continued)

(56) References Cited

U.S. PATENT DOCUMENTS 8,615,241 B2    12/2013   Gupta et al.
2007/0291730 A1   12/2007   Monfet et al.
(Continued)

FOREIGN PATENT DOCUMENTS

WO    2007109220    9/2007
WO    2009146582    12/2009

OTHER PUBLICATIONS

Unknown Author, "Remaining Details for CA-based HetNets.", 3rd Generation Partnership Project. 3GPP TSG RAN WG1 Meeting #63bis, R1-110031, Jan. 17-20, 2011, Dublin, Ireland, pp. 1-4.
(Continued)

*Primary Examiner* — Allahyar Kasraian
(74) *Attorney, Agent, or Firm* — Murphy, Bilak & Homiller, PLLC

(57) ABSTRACT

A method of cell detection, for a user equipment (UE) of a first cell, wherein the first cell operates on a first frequency, from a second cell, wherein UE is served by the second cell, and the second cell operates on a second frequency different form the first frequency, is disclosed. The method comprises performing cell detection on the first frequency while the UE is associated with the second cell on the second frequency; detecting at least one cell identification (ID) candidate on the first frequency; determining whether verification of cell ID is to be done prior or after a predetermined event has occurred; and if it is determined that verification is to be done after the predetermined event, postponing the verification and performing the verification after the predetermined event has occurred. Methods of cell identification and handover are also disclosed. A communication apparatus and a computer program are also disclosed.

17 Claims, 10 Drawing Sheets

Related U.S. Application Data

(60) Provisional application No. 61/594,499, filed on Feb. 3, 2012.

(51) Int. Cl.
*H04W 36/00* (2009.01)
*H04W 84/04* (2009.01)

(58) Field of Classification Search
USPC .......... 455/436–444, 410–411; 370/331–334
See application file for complete search history.

(56) References Cited

U.S. PATENT DOCUMENTS

| | | | | |
|---|---|---|---|---|
| 2009/0144548 A1* | 6/2009 | Tzavidas | ................. | H04L 63/08 713/169 |
| 2009/0268690 A1* | 10/2009 | Sebire | ................... | H04W 48/10 370/332 |
| 2009/0316659 A1* | 12/2009 | Lindoff | ................ | H04J 11/0069 370/332 |
| 2013/0058234 A1* | 3/2013 | Yang | ..................... | H04L 27/261 370/252 |
| 2013/0294281 A1* | 11/2013 | Lee | ....................... | H04W 24/10 370/252 |
| 2014/0146756 A1* | 5/2014 | Sahin | .................... | H04L 1/0025 370/329 |
| 2014/0247808 A1* | 9/2014 | Zhang | .................... | H04L 5/003 370/331 |

OTHER PUBLICATIONS

Unknown Author, "Text Proposal for E-UTRAN FOO-GSM Measurements test case.", 3rd Generation Partnership Project. 3GPP TSG-RAN5 Meeting #43, R5-092651, Apr. 20-24, 2009, Vilnius, Lithuania, pp. 1-8.

3GPP, "3rd Generation Partnership Project; Technical Specification Group Radio Access Network; Evolved Universal Terrestrial Radio Access (E-UTRA); Requirements for support of radio resource" 3GPP TS 36.133 V10.5.0 (Dec. 2011), 1-544.

\* cited by examiner

METHOD, APPARATUS AND COMPUTER PROGRAM FOR CELL IDENTIFICATION

RELATED APPLICATIONS

This application is a continuation of co-pending U.S. patent application Ser. No. 13/755,411, filed 31 Jan. 2013, which claims benefit of provisional application 61/594,499 filed 3 Feb. 2012. The entire contents of each of the aforementioned applications are incorporated herein by reference.

TECHNICAL FIELD

The present invention generally relates to a method, apparatus and computer program for cell identification performed by a wireless device in a wireless communications networks.

BACKGROUND

In cellular communication networks, the mechanism of handover is a key feature for enabling the cellular properties of seamless mobility. In conventional cellular networks, with each base station operating a cell with a certain coverage, handover is performed when signal interchange with one base station is becoming weak and signal interchange is expected to be better with another base station. The interest in deploying low-power nodes (such as pico base stations, home eNodeBs, relays, remote radio heads, etc.) for enhancing the macro network performance in terms of the network coverage, capacity and service experience of individual users has been constantly increasing over the last few years. At the same time, there has been realized a need for enhanced interference management techniques to address the arising interference issues caused, for example, by a significant transmit power variation among different cells and cell association techniques developed earlier for more uniform networks. Thus, as so called heterogeneous cellular networks appear, i.e. where there are cells and base stations on different levels, the handover task becomes more complicated. Here, the terms macro cell and pico cell are used in this disclosure, although different prefixes, e.g. micro, femto, etc., may be used in the field, to denote the higher level and the lower level type of cells, respectively.

Conventionally, a UE associated with a cell operating on one frequency, but which may have better communication when associated with a pico cell operating on another frequency need to find a macro cell covering the pico cell attractive for handover, make handover to the macro cell, and then possibly finding the beneficial communication of the pico cell. It is therefore a desire to find an approach for improving mobility at least for such cases.

SUMMARY

The invention is based on the understanding that detection of cell ID and cell verification can be treated separately, with the saving of cell ID candidates between the detection and verification, to improve handover in certain situations.

The inventors have found that at least some of the issues elucidated above can be remedied by applying one or more of the following main concepts:

The concept of two-step cell identification with network interaction in between step 1 and step 2, including the UE capability to support Cell identification Step 2, Methods and enhanced signaling means to support two-step cell identification, Methods in the UE and network node for deciding a cell identification approach, Enhanced support for inter-frequency measurements and mobility with eICIC, Other approaches and features related to the above are also described, and the above demonstrated list is only for facilitating the understanding of this disclosure, and in not to be considered as limiting.

Aspects of the invention are defined by the independent claims. Embodiments thereof are defined by the dependent claims.

According to a first aspect, there is provided a method of cell detection, for a user equipment, UE. The method comprises performing cell search; detecting at least one cell identity, ID, candidate; determining whether verification of cell ID is to be done prior or after a predetermined event has occurred; and if it is determined that verification is to be done after the predetermined event, postponing the verification and performing the verification after the predetermined event has occurred.

The detection may be of a first cell, wherein the first cell operates on a first frequency, wherein the UE is served by a second cell, and wherein the second cell operates on a second frequency different from the first frequency. The performing of cell search may be on the first frequency while the UE is served by the second cell on the second frequency and the detecting of at least one cell identity, ID, candidate may be made on the first frequency.

The predetermined event may be any of handover, carrier change, primary carrier change, and reception of a measurement pattern from a network node.

The method may further comprise reporting an event comprising sending a list of cells, wherein the list comprises the at least one cell ID candidate The UE may be in a cell extension zone of the cell serving the UE.

The performing of the verification may include an intra-frequency measurement.

The predetermined event may comprise reception of a measurement pattern, the performing of the verification may include an intra-frequency measurement, and the measurements may be on the first frequency and may be performed in selected subframes in the received measurement pattern The first cell may be a first pico cell having a coverage area in common with at least a part of a coverage area of a first macro cell, wherein the first pico cell and the first macro cell operate on the first frequency. The second cell may be a second pico cell having a coverage area in common with at least a part of a coverage area of a second macro cell, wherein the second pico cell and the second macro cell operate on the second frequency.

The detection of the at least one cell ID may be based on known secondary synchronisation signal, SSS, sequences and on known primary synchronisation signal, PSS, sequences. The detection of the at least one cell ID may comprise determining cell identity group based on known secondary synchronisation signal, SSS, sequences; and determining identity within the group based on known primary synchronisation signal, PSS, sequences.

The verification may comprise measuring cell-specific reference signals, CRS.

According to a second aspect, there is provided a method of handover, for a user equipment, UE, to a first cell, wherein the UE is served by a second cell. The method comprises performing cell detection according to the first aspect; and performing handover from the second cell to the first cell.

The first cell may operate on a first frequency, and the second cell may operate on a second frequency different from the first frequency.

The performing of the handover may comprise reporting a handover event to a base station operating the second cell after verification of the cell ID; receiving a handover instruction from the base station; and making handover according to the handover instruction.

The handover instruction may include instructions to make handover to a third cell operating on the first frequency.

The performing of the handover may comprise initiating handover upon a handover event prior verification of the cell ID; and performing the verification after initiating the handover. The initiating of handover may comprise transmitting a handover report including an unverified cell ID.

According to a third aspect, there is provided a method of cell identification, by a user equipment, UE. The method comprises performing a first cell identification step consisting of cell detection; performing at least one action associated with network interaction; and if the first cell detection step and the at least one action associated with network interaction so requires, performing a second cell identification step including verification of a cell detected by the first cell identification step.

The method may further comprise performing the second cell identification step after the at least one action. The method may, further comprise signalling the UE's capability to support two-step cell identification, the two-step cell identification comprising the first cell identification step and the second cell identification step, to a network.

The at least one action may comprise reporting a result obtained in the first cell identification step or an event associated with the result of the first cell identification step.

The network interaction may be any of: handover, cell change, carrier change or component carrier reconfiguration.

The method may further comprise performing a step of deciding whether to proceed to the second cell identification step, wherein the step of deciding preceding the network interaction step.

According to a fourth aspect, there is provided a communication apparatus suitable for operating in a cellular communication network, wherein the apparatus is arranged to perform the method according to any of the first to third aspects.

According to a fifth aspect, there is provided a computer program comprising instructions which, when executed on a processor of a communication apparatus, causes the communication apparatus to perform the method according to any of the first to third aspects.

In this context, the term User Equipment, UE, which term is widely used as a generic term for example in standard specifications and scientific disclosures, refers to equipment suitable to work in a wireless cellular network such that it enables communication through wireless cellular communication networks. The UE may for example be a mobile phone, a smartphone, a wireless modem (e.g. a computer card to be inserted into a computer or device comprising processing means, or a connectable modem connected to the computer or device comprising processing means via wired or wireless connection), or other equipment capable of communicative operation within a cellular communication network.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

In 3GPP, heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, i.e. small geographical areas with a higher user density' and/or higher traffic intensity where installation of pico nodes can be considered to enhance performance. Heterogeneous deployments may also be viewed as a if densifying networks to adopt for the traffic needs and the environment. However, heterogeneous deployments bring also challenges for which the network has to be prepared to ensure efficient network operation and superior user experience. Some challenges are related to the increased interference in the attempt to increase small cells associated with low-power nodes, aka cell range expansion; the other challenges are related to potentially high interference in uplink due to a mix of large and small cells.

Figure 9:
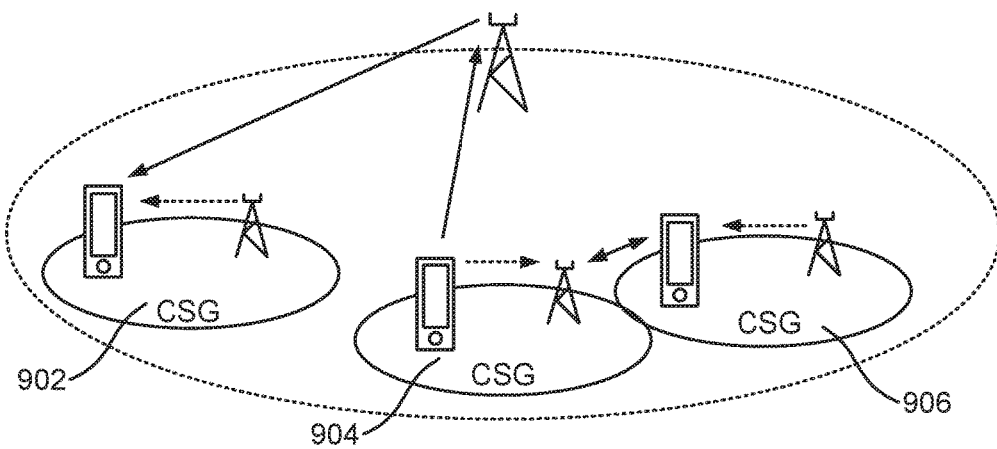
FIG. 9 illustrates various interference scenarios in heterogeneous deployments.

According to 3GPP, heterogeneous deployments consist of deployments where low power nodes are placed throughout a macro-cell layout. The interference characteristics in a heterogeneous deployment can be significantly different than in a homogeneous deployment, in downlink or uplink or both. Examples hereof are given in FIG. 9, which illustrates various interference scenarios in heterogeneous deployments, where in case 902, a macro user with no access the Closed Subscriber Group (CSG) cell will be interfered by the HeNB, in case 904 a macro user causes severe interference towards the HeNB and in case 906, a CSG user s interfered by another CSG HeNB.

Figure 10:
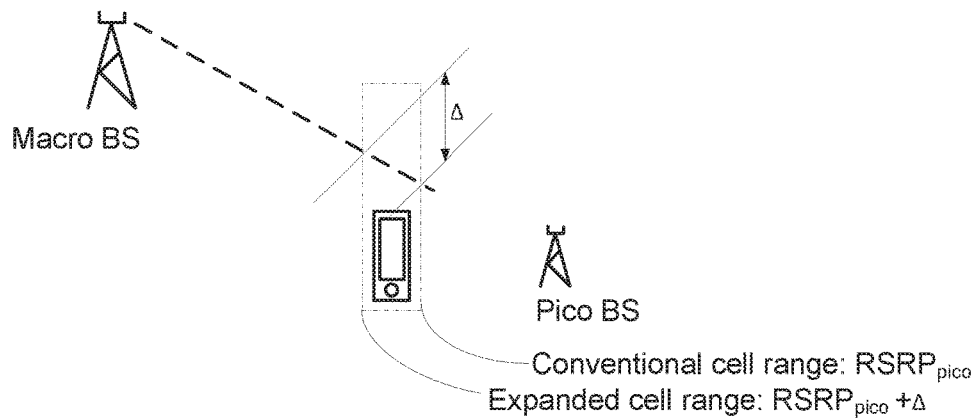
FIG. 10 illustrates cell range expansion in heterogeneous networks.

However, a heterogeneous network does not necessarily imply using CSG cell. For example, another interference scenario is illustrated in FIG. 10, where a deployment with two nearby cells transmitting at different power levels is shown. The coverage of the lower-power cell is extended by using a technique known as cell range expansion. With this technique, cell selection/re-selection diverges from the RSRP-based approach, e.g. towards pathless- or pathgain-based approach, and hereby extending the coverage of the lower-power cell. The lower-power cell may be associated, for example, with a pico cell. As shown in FIG. 10, cell range expansion (also referred to as cell range extension) may be controlled by a delta-parameter. The larger the delta parameter, the larger the lower-power cell coverage is, and the weaker the serving (expanded) cell is relative to the interferer cell. One can observe that UEs in the cell range expansion zone experience lower signal quality for the serving cell due to the strong signal from the interfering neighbour cell.

To facilitate measurements in the expanded cell range, i.e., where high interference is expected, the standard specifies Almost Blank Subframe (ABS) patterns for eNodeBs and restricted measurement patterns for UEs. A pattern is a bit string indicating restricted and unrestricted subframes characterized by a length and periodicity, which are different for FDD and TDD (40 subframes for FDD and 20, 60 or 70 subframes for TDD).

To facilitate measurements in the expanded cell range, i.e., where high interference is expected, the standard specifies Almost Blank Subframe (ABS) patterns for eNodeBs and restricted measurement patterns for UEs. A pattern is a bit string indicating restricted and unrestricted subframes characterized by a length and periodicity, which are different for FDD and TDD (40 subframes for FDD and 20, 60 or 70 subframes for TDD).

Restricted measurement subframes are configured to allow the UE to perform measurements in subframes with improved interference conditions, which may be implemented by configuring ABS patterns at eNodeBs, and avoid measuring in high-interference conditions. Restricted measurement patterns are in general UE-specific. Three patterns are currently specified in the standard to enable restricted measurements:

Serving-cell pattern for RLM and RRM measurements;
Neighbor-cell pattern for RRM measurements;
Serving-cell pattern for CSI measurements.

ABS pattern is a transmission pattern at the radio node; it is cell-specific and may be different from the restricted measurement patterns signaled to the UE. In a general case, ABS are low-power and/or low-transmission activity subframes. ABS patterns may be exchanged between eNodeBs via X2, but these patterns are not signalled to the UE, unlike the restricted measurement patterns.

Cell search is one of the basic UE operations in a cellular network. To find a cell, the UE receives radio signals and searches for signals with a specific, known to the UE, signature. To identify a new cell, the UE has to identify the cell and then, optionally or upon a request, obtain the globally unique CGI Cell Global Identity (CGI). In LTE, cell identification includes detection of the cell and additionally performing a signal strength or signal quality measurement (aka verification), where the measurement may be RSRP or RSRQ.

Figure 11:
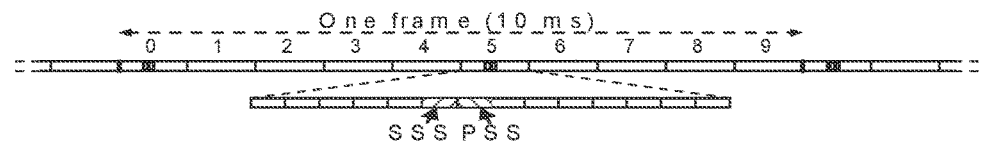
FIG. 11 illustrates location of synchronisation signals in an LTE frame.
Figure 12:
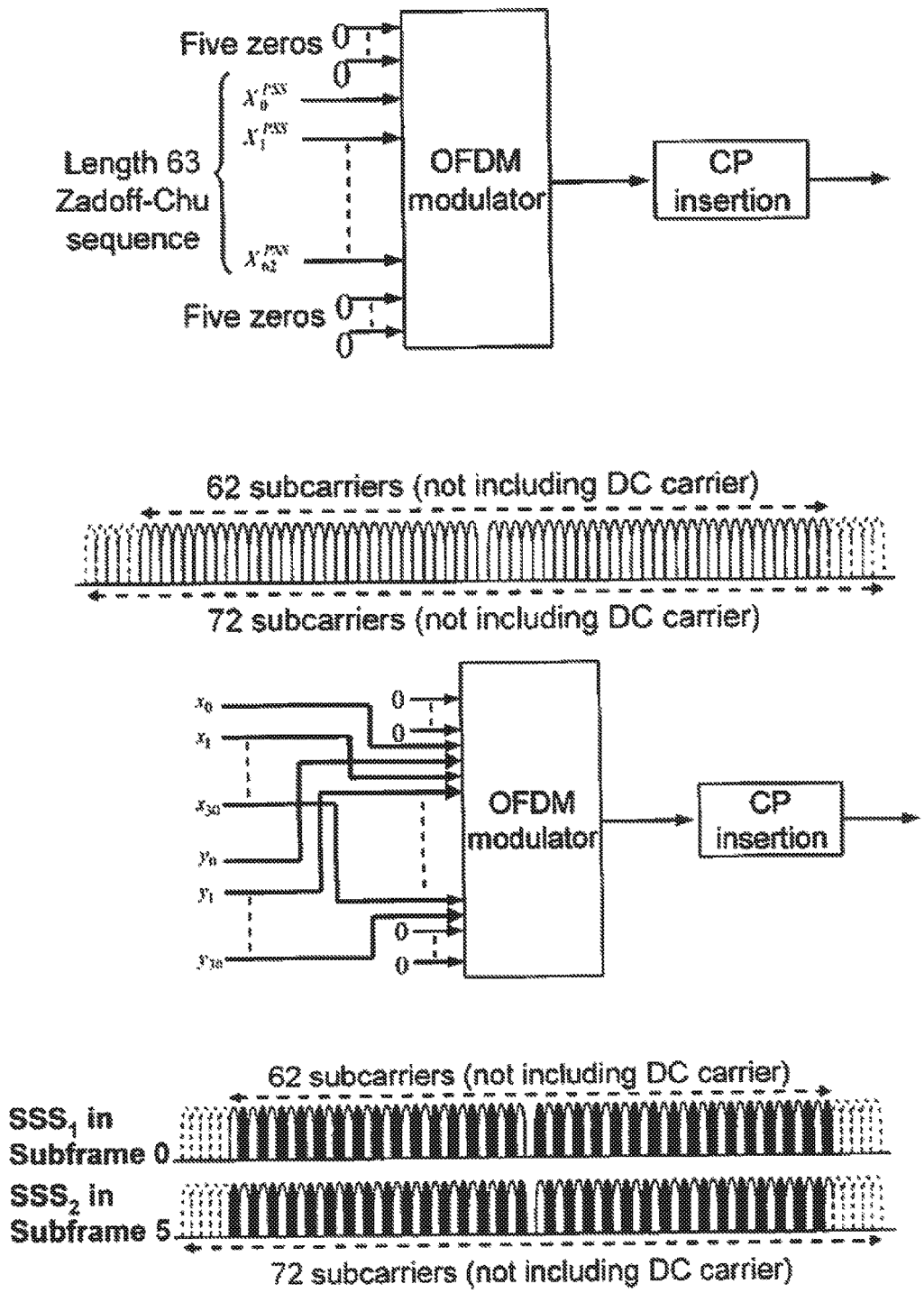
FIG. 12 illustrates synchronisation signal contents and resource element mapping.

Cell detection is performed based on synchronization signals and more specifically on Primary Synchronization Signal (PSS) and Secondary Synchronization Signal (SSS). There are 504 unique physical-layer cell identities (PCIs). The physical-layer cell identities are grouped into 168 unique physical-layer cell--identity groups, each group containing three unique identities. The grouping is such that each physical-layer cell identity is part of one and only one physical-layer cell-identity group. A physical-layer cell identity is thus uniquely defined by a number in the range of 0 to 167, representing the physical-layer cell-identity group, and a number in the range of 0 to 2, representing the physical-layer identity within the physical-layer cell-identity group. The SSS is in fact scrambled by a scrambling code based on the PSS. Hence, in some embodiments the PCI may be determined by the SSS only. In some embodiments, the cell identity group is determined based on the known SSS sequences, and the identity within the group is determined based on the known PSS sequences. All unique combinations of PSS and SSS give 504 unique PCIs, which may be reused in the same PLMN network on one frequency and/or across frequencies. PCI of a cell can then be used to determine sequences of other signals (e.g. cell-specific reference signals, CRS, positioning reference signals, PRS, etc.) and its allocation in the time-frequency grid. The synchronization signals occupy 62 resource elements in the centre of the allocated bandwidth as shown in FIGS. 11 and 12. In a synchronous network, PSS/SSS from one cell overlap/interferer with PSS/SSS from another cell, which correspond to reuse-1 or 100% load all the time on these signals.

Figure 13:
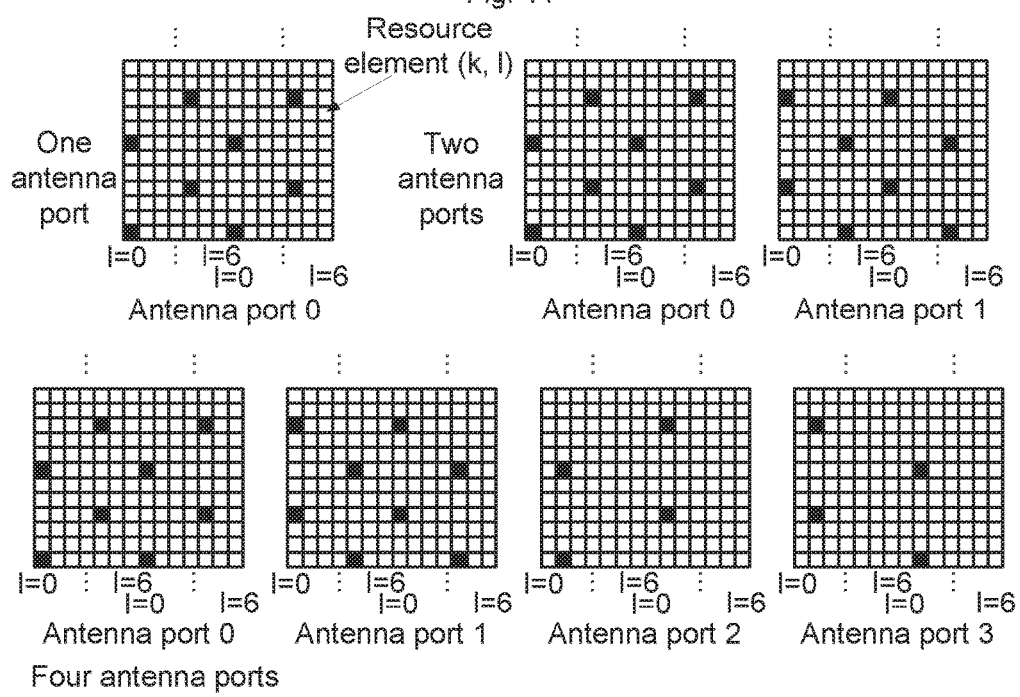
FIG. 13 illustrates cell-specific reference signal resource element mapping according to 3GPP TS 36.211 specification.

RSRP and RSRQ measurements are performed on cell-specific reference signals (CRS). The CRS signals are allocated in time-frequency grid as shown in FIG. 13, where this is shown for the cases of use of one, two and four antenna ports, respectively. The depicted resource element grids represent an even-numbered slot (1=0, . . . , 6) and an odd--numbered slot (1=0, . . . , 6), respectively. Resource elements marked black are reference symbols used for respective antenna port. Upon use of more than one antenna port, the resource element of an antenna port corresponding to a position in the grid which is assigned a reference symbol for any of the other antenna ports is not used. Different cells can use 6 different shifts in frequency. In practice there is a reuse-6 pattern for CRS transmitted from one TX antenna port and reuse-3 pattern for CRS transmitted from two TX antenna ports, etc. In low load the interference could then be favourable for time measurements on CRS. In high load however the situation becomes similar to PSS/SSS. Practical networks, however, seldom operate with load higher than 70% in downlink, so the interference situation is typically better for CRS than for PSS/SSS. Interference conditions may be further improved on CRS by configuring ABS (reduced-power or low activity subframes) in the interfering aggressor cells.

CGI may be obtained via reading system information transmitted over a broadcast channel. The UE may be requested by eNodeB to report CGI of a cell identified by the UE; the request may be triggered by a measurement report for the identified cell received by eNodeB from the UE.

Generally, cell identification may be performed
  on the frequency of PCell (intra-frequency),
  on a frequency of an SCell, which is also a serving cell with carrier aggregation (inter-frequency, with carrier aggregation),
  on a different frequency than serving cell frequencies (inter-frequency), on a different RAT (inter-RAT).

Inter-frequency and inter-RAT may also be inter-band when the frequencies belong to different frequency bands.

The current cell identification requirements specify a certain period during which the UE has to perform cell identification and report a corresponding event to the network. The required period T includes both the time necessary for detecting a cell and the time T1 for performing a measurement. The current standard specifies both T and T1 time periods. Further, the UE is typically required to report N (e.g., N=8) identified cells within the required period. The requirements for cell identification typically differ (e.g., in the measurement period length, number of cells, number of frequencies, etc.) for intra-frequency, inter-frequency and inter-RAT.

The non-CA UE would normally require measurement gaps for performing inter-frequency or inter-RAT cell identification. The same applies for CA UE when performing cell identification on non-configured or deactivated carrier.

Embodiments of the invention described herein apply for non-carrier aggregation (CA) and CA networks. The CA concept is briefly explained below.

A multi-carrier system (or interchangeably called as the CA) allows the UE to simultaneously receive and/or transmit data over more than one carrier frequency. Each carrier frequency is often referred to as a component carrier (CC) or simply a serving cell in the serving sector, more specifically a primary serving cell or secondary serving cell. The multi-carrier concept is used in both HSPA and LTE. Carrier aggregation is supported for both contiguous and non-contiguous component carriers, and component carriers originating from the same eNodeB need not to provide the same coverage.

Serving Cell: For a UE in RRC_CONNECTED not configured with CA there is only one serving cell comprising of the primary cell (PCell). For a UE in RRC_CONNECTED configured with CA the term 'serving cells' is used to denote the set of one or more cells comprising of the primary cell and all secondary cells.

Primary Cell (Pcell): the cell, operating on the primary frequency, in which the UE either performs the initial connection establishment procedure or initiates the connection re-establishment procedure, or the cell indicated as the primary cell in the handover procedure.

Secondary Cell (Scell): a cell, operating on a secondary frequency, which may be configured once an RRC connection is established and which may be used to provide additional radio resources.

In the downlink, the carrier corresponding to the PCell is the Downlink Primary Component Carrier (DL PCC) while in the uplink it is the Uplink Primary Component Carrier (UL PCC). Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

Activation and deactivation of secondary cells: In CA the base station (e.g. eNode B) in LTE can deactivate one or more secondary cells on the corresponding secondary carriers. The deactivation is done by the eNB using lower layer signalling (e.g. over PDCCH in LTE) using a short command such as ON/OFF (e.g. using 1 bit for each Scell.). The activation/deactivation command is sent to the UE via the Pcell. Typically the deactivation is done when there is no data to transmit on the Scell(s). The activation/deactivation can be done independently on uplink and downlink Scell.

The purpose of the deactivation is thus to enable UE battery saving. The deactivated Scell(s) can be activated also by the same lower layer signalling.

A UE may not require measurement gaps for performing measurements on a. configured carrier component.

At least the following issues may occur with the earlier solutions:

The network does not expect the UE to report a result of the incomplete cell identification, so
  there are no methods in the network to distinguish between a reported result of the detection-only step and complete cell identification,
  there are no methods in network nodes (e.g., eNodeB) to handle such reports in a different way,
  a the network cannot use, make any decisions or perform any specific action responsive to such reports;

In previous solutions, the UE performs cell detection immediately followed by a measurement, and as a consequence
  a conventional UE does not report a cell without performing the measurement and does not report any event based only on the cell detection step of the cell identification,
  a conventional UE has no possibility to perform the verification measurement to complete cell identification after reporting the result of the detection step or after performing any interaction with the network,
  when the verification step is performed after reporting the detection result, it is also not straightforward what is the UE behaviour or network behaviour if the verification step resulted in that the detection result was not correct,
  there are no to decide on whether the verification step may be postponed or riot, e.g., given an additional cell identification approach described by the current invention, there is also a need to decide on when to perform conventional cell identification and when follow the new cell identification approach.

In previous solutions, the measurement is performed from the same carrier frequency or carrier component as cell detection, e.g., the UE served by a PCell (or serving cell in non-CA) on f2 and trying to identify a cell on f1 would normally complete the cell identification, i.e., including detection and the measurement, while being on the PCell. In case a handover or PCell switching occurs during cell identification, the conventional UE would either complete the cell identification prior handover/switching, break the cell identification procedure or restart cell identification (intra- or inter-frequency) after handover/switching.
  E.g., there are no methods in the UE to perform the detection step as inter-frequency followed by intra-frequency verification step.

Two-step handover or two-step cell switching has not been of any specific use for conventional UE, so the embodiments described herein specifically for the two-step handover/cell switching are new to the conventional UE, and in particular for the two-step handoverkell switching in heterogeneous networks.

Cell identification requirements under a cell change in general are currently not defined, where the cell change may be any of: handover, PCell change, carrier change or PCC change, cell activation/deactivation, or configuring/reconfiguring SCells or SCCs. The conventional UE would complete before the cell change, break the cell identification activity or restart cell identification after the cell change. The conventional approach would typically not continue cell identification of the same cell after changing a cell. Changing cells will typically be more dynamic and more common in networks with small cells and carrier aggregation based networks, so restarting a time consuming cell search each time is not efficient.

In previous solutions, there are no procedures in the to perform cell detection prior receiving cell identification assistance data or measurement pattern and then perform the verification step using the assistance data or measurement patterns for the verification measurement.

Figure 1:
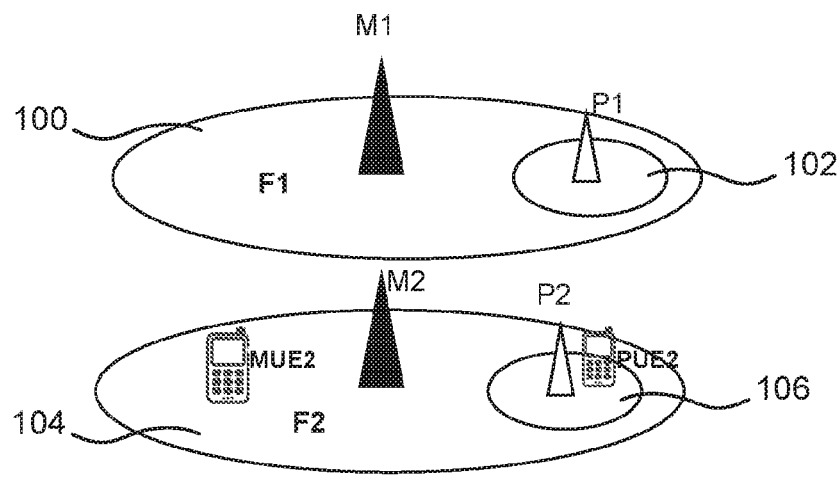
FIG. 1 schematically illustrates an environment in which embodiments are applicable.

FIG. 1 schematically illustrates an environment in which embodiments are applicable. A first macro cell 100 operated by a base station M1 on a first frequency F1 also covers an area where a first pico cell 102 operated by a base station P1 operating on the first frequency F1. A second macro cell 104 operated by a base station M2 on a second frequency F2 also covers an area where a second pico cell 106 operated by a base station P operating on the second frequency F2. The first and second frequencies F1, F2 are different. Embodiments are applicable to a UE MUE2 associated with the second macro cell which desires to perform handover to any of the cells 100. 102 operating on the first frequency F1. Embodiments are applicable to a UE PUE2 associated with the second pico cell 106 which desire to perform handover to any of the cells 100, 102 operating on the first frequency F1. A particular problem arises for example for PUE2 when trying to make measurements on the first pico cell 102 when restricted subframes are used for such measurements, but the timing of those restricted subframes are not known and/or aligned for the cells of the first frequency F1.

Figure 2:
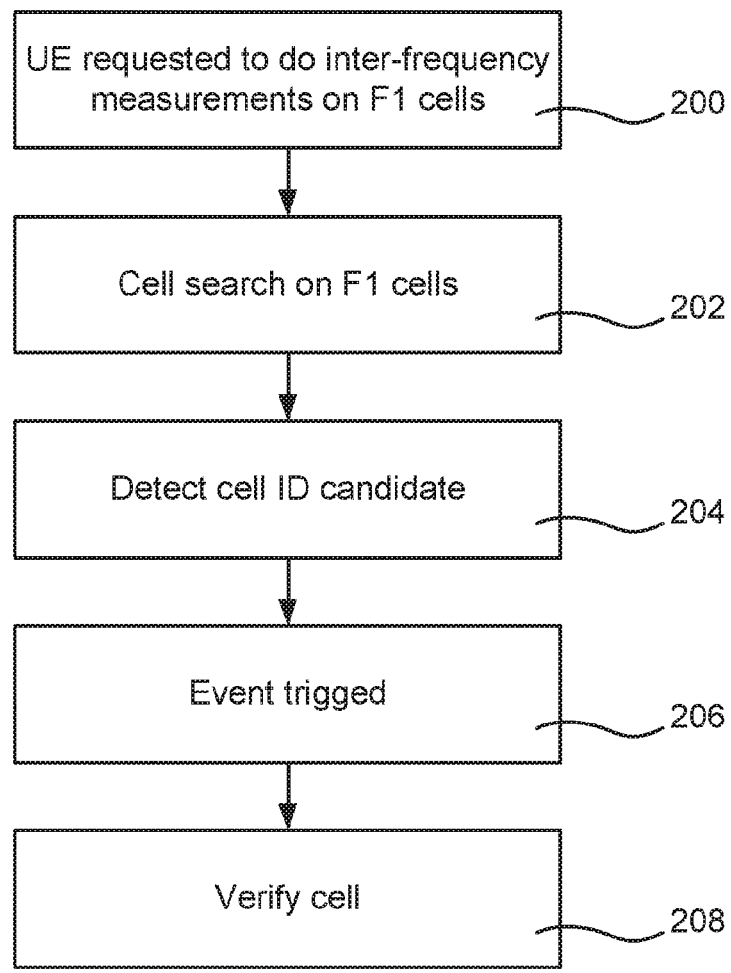
FIG. 2 is a flow chart illustrating a method according to an embodiment.

FIG. 2 is a flow chart illustrating a method according to an embodiment. A UE associated with a cell operating in the second frequency F2, i.e. any of MUE2 or PUE2 depicted in FIG. 1, is requested 200 to do inter-frequency measurements on cells operating on the first frequency F1. The UE then performs 202 cell detection on the first frequency F1, i.e. while still being associated with a cell operating in the second frequency F2. One or more candidates are expected to be found, and the UE detects 204 at least one cell identification (ID) candidate among cell or cells operating on the first frequency F1. Consider that this cell is the second pico cell 106 depicted in FIG. 1. It should be noted here that detection may be possible, but measurements for making verification may not be feasible due to the issue demonstrated above. If verification is feasible and there are no issues about that, the process can proceed conventionally, e.g. with handover. However, for other cases, the cell ID candidate can be stored in a list, which may only comprise one item or more items, in the UP. Upon an event occurring 206, e.g. handover, carrier change, primary carrier change or reception of a measurement pattern such that the issue is solved, the UE can use the stored information with the cell ID candidate and perform 208 verification of it, e.g. by measurement of received power of reference symbols (RSRP).

Figure 3:
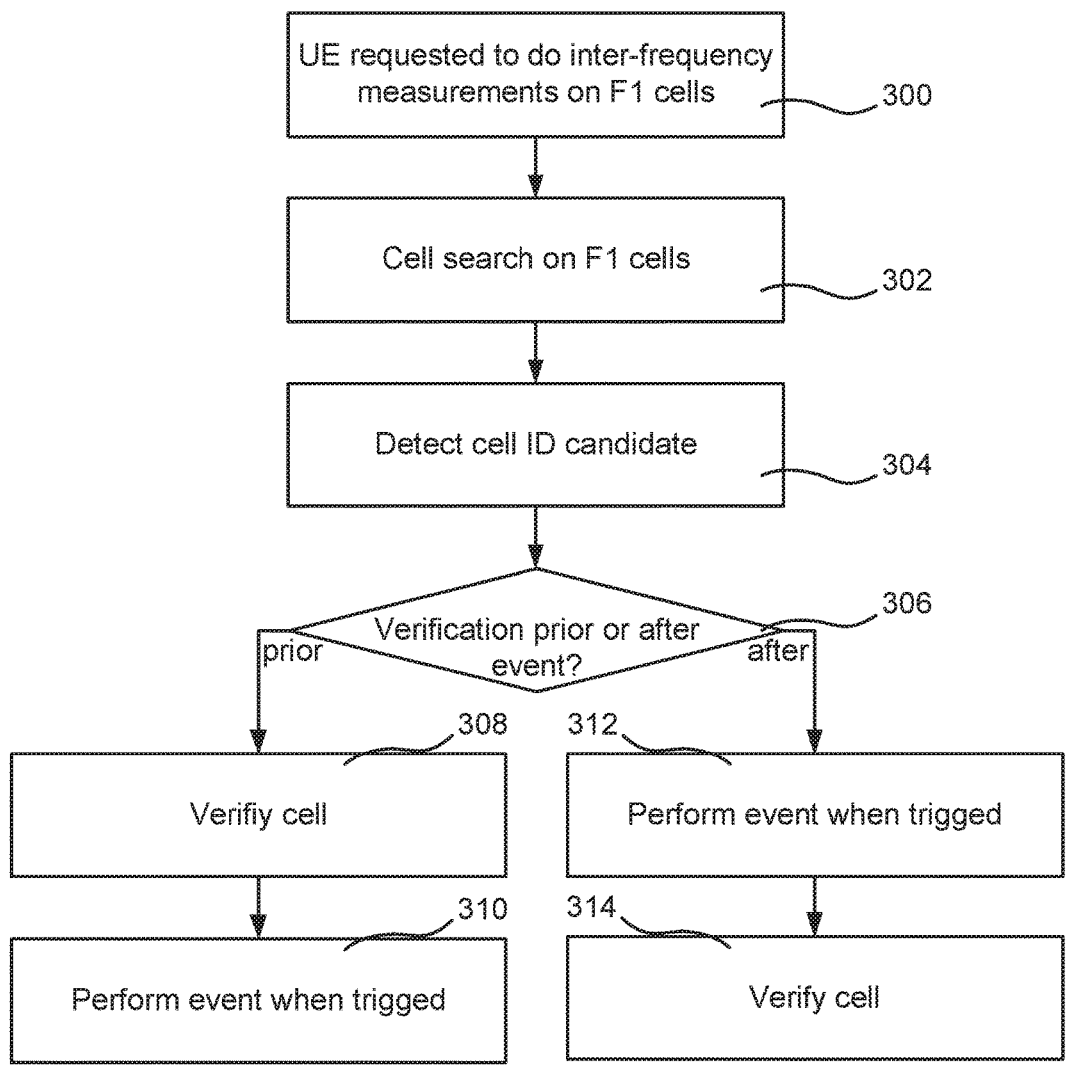
FIG. 3 is a flow chart illustrating a method according to an embodiment.

FIG. 3 is a flow chart illustrating a method according to an embodiment. A UE associated with a cell operating in the second frequency F2, i.e. any of MUE2 or PUE2 depicted in FIG. 1, is requested 300 to do inter-frequency measurements on cells operating on the first frequency F1. The UE then performs 302 cell detection on the first frequency F1, i.e. while still being associated with a cell operating in the second frequency F2. One or more candidates are expected to be found, and the UE detects 304 at least one cell identification (ID) candidate among cell or cells operating on the first frequency F1. In this embodiment, it is determined 306 whether verification is to be made prior or after an event has occurred (see examples above). If the verification is to be made prior the event has occurred, e.g. if verification is easily feasible, verification performed 308, and the event can be performed 310 when triggered. On the other hand, if the verification is to be made after the event has occurred, e.g. due to the issues demonstrated above, the verification is postponed and when the event is triggered 312, the procedure proceeds to performing 314 the verification.

Figure 4:
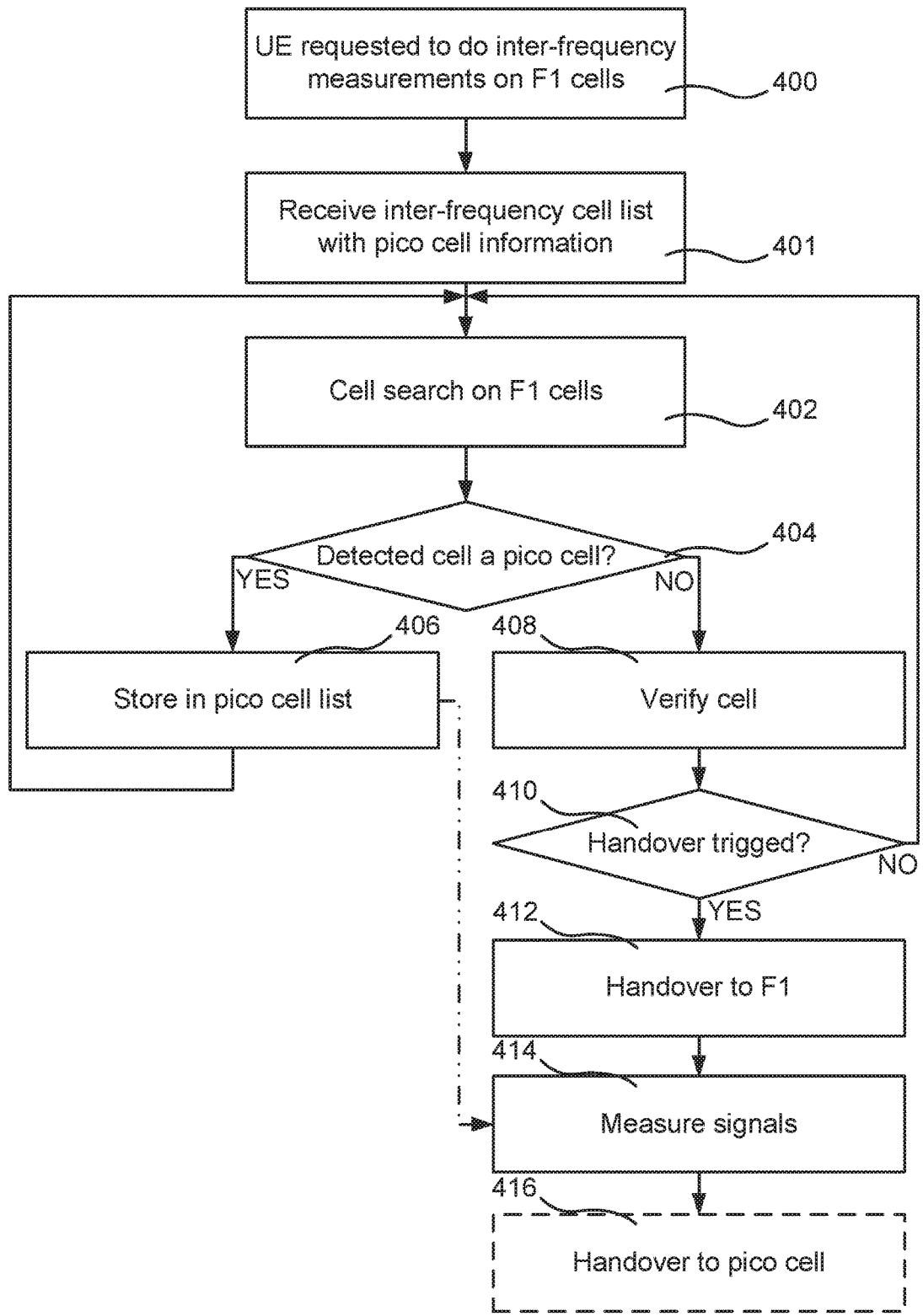
FIG. 4 is a flow chart illustrating a method according to an embodiment.

FIG. 4 is a flow chart illustrating a method according to an embodiment. Similar to the above demonstrated embodiments, a associated with a cell operating in the second frequency F2 is requested 400 to do inter-frequency measurements on cells operating on the first frequency F1. Here, the UE receives 401 an inter-frequency cell list with pico cell information, and performs 402 cell search on the first frequency F1. If a detected cell is a pico cell, which can be determined 404 since the inter-frequency cell list with pico cell information is available, it is stored 406, and the procedure returns to the cell searching 402. The hash-double-dot arrow from the storing 406 denotes where the stored information is preferred to be used. If the detected cell is not a pico cell, the procedure proceeds with verifying 408 the cell, e.g. as demonstrated above. It is determined 410 whether handover is triggered. If handover is not triggered, the cell searching 402 proceeds. If handover triggered, handover is performed 412 to a first frequency cell and measurements and restriction information for pico cells are received. Signal measurements performed 414 for detected pico cells, wherein the stored information of the pico cell list is used. If feasible, handover is performed 416 to a pico cell. Here, an inter-frequency eICIC (enhanced Inter-Cell Interference Coordination) cell list, which can be seen as a pro-active provisioning of intra-frequency cell list while the UE is on another frequency, can be provided in 401, wherein the UE receives the list and performs unverified cell search 402 on detected pico cells, stores 406 the results, goes through the handover 412 to macro cell and then uses the list for intra--frequency measurements 414 from the macro cell.

Figure 5:
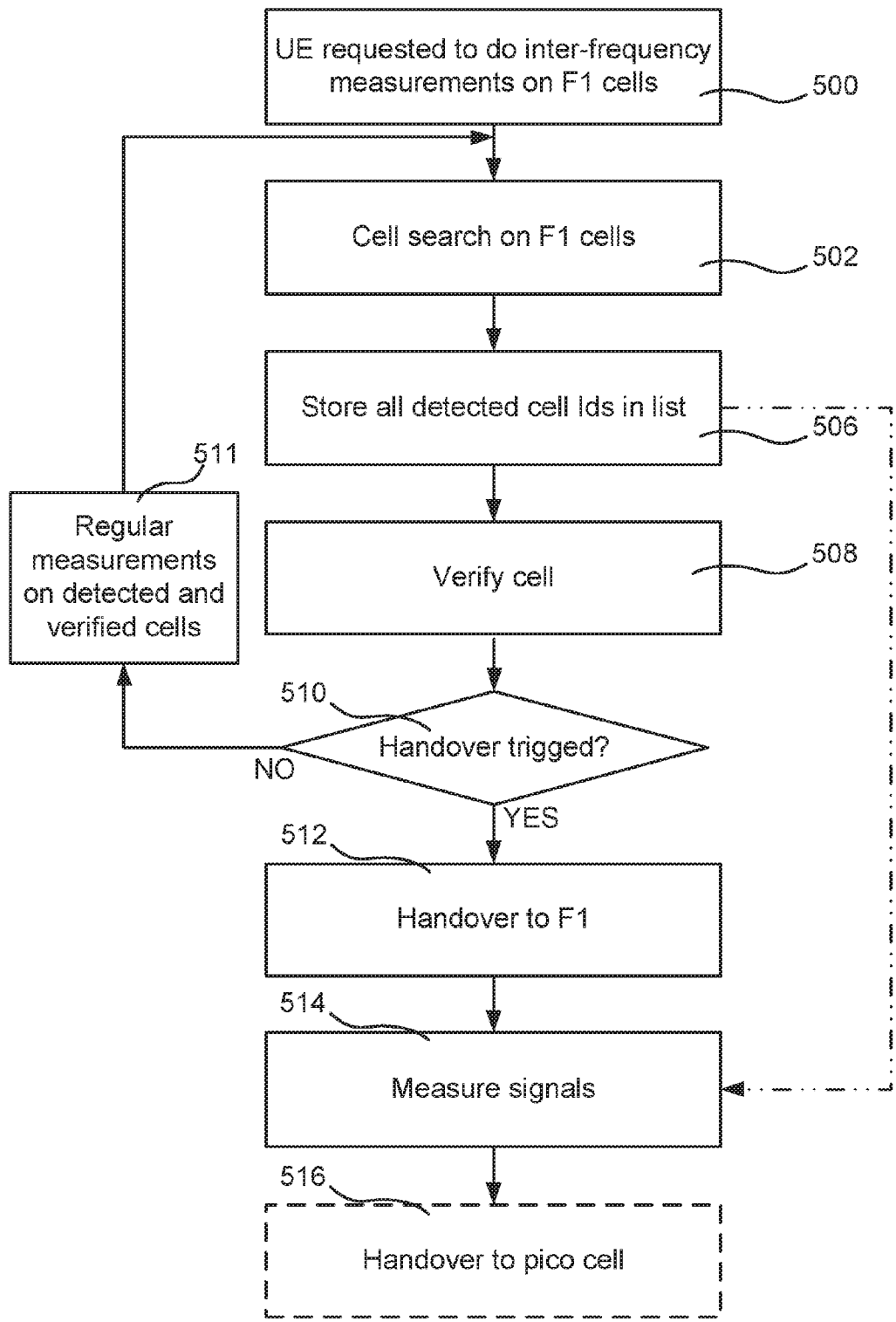
FIG. 5 is a flow chart illustrating a method according to an embodiment.

FIG. 5 is a flow chart illustrating a method according to an embodiment. A UE associated with a cell operating in the second frequency F2, i.e. any of MUE2 or PUE2 depicted in FIG. 1, is requested 500 to do inter-frequency measurements on cells operating on the first frequency F1. The UE then performs 502 cell detection on the first frequency F1, i.e. while still being associated with a cell operating in the second frequency F2. One or more candidates are expected to be found, and the UE detects at least one cell identification CID) candidate among cell or cells operating on the first frequency H. All detected cell IDs are stored 506 in a list. Here, the hash-double-dot line in FIG. 5 indicates where the list is used. Further, at least one cell is verified 508, similar to what has been demonstrated above. It is determined 510 whether handover is triggered. If handover is not triggered, regular measurements are made 511 on detected and verified cells, e.g. by performing RSRP/RSRQ measurements, and the cell searching 502 proceeds. If handover is triggered, handover s performed 512 to a first frequency cell and measurements and restriction information for pico cells are received. Thus, intra-frequency eICIC cell list with the pico cell can be provided right after or during handover. Signal measurements are performed 514 for detected pico cells, wherein the stored information of the pico cell list is used. If feasible, handover is performed 516 to a pico cell.

Figure 6:
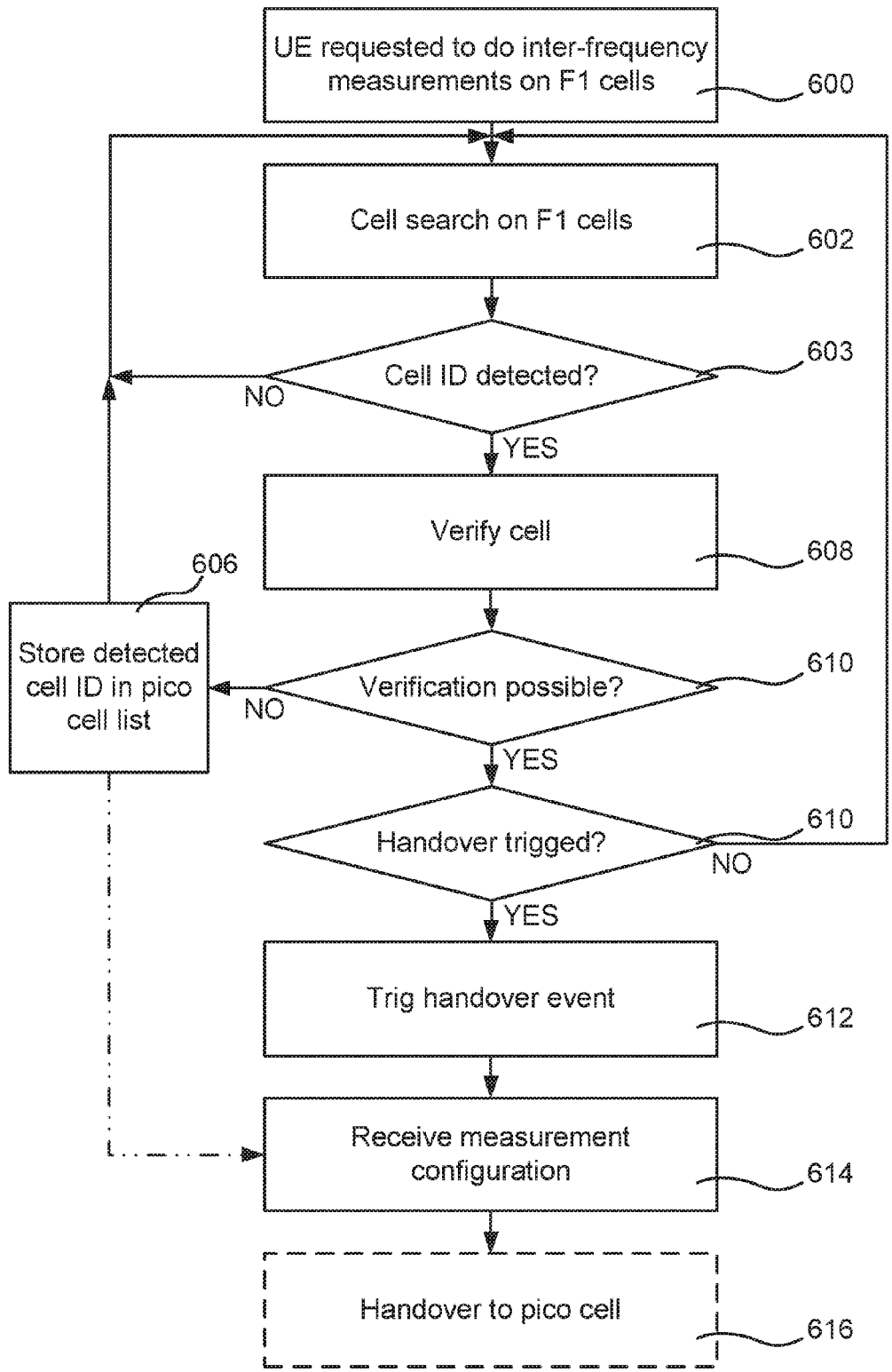
FIG. 6 is a flow chart illustrating a method according to an embodiment.

FIG. 6 is a flow chart illustrating a method according to an embodiment. A UE associated with a cell operating in the second frequency F2. i.e. any of MUE2 or PUE2 depicted in FIG. 1, is requested 600 to do inter-frequency measurements on cells operating on the first frequency F1. The UE then performs 602 cell detection on the first frequency F1, i.e. while still being associated with a cell operating in the second frequency F2. It is checked 603 whether any cell iD is detected. If not, the procedure continues cell searching 602. If at least one cell ID is detected, at least an attempt to verify 608 the cell is made, e.g. by doing signal measurements using CRS. It is checked 609 whether verification is possible. If verification is not possible, detected cell ID is stored 606 in a pico cell list, and the procedure returns to cell searching 602. If verification is possible, it is determined 610 whether handover is trigged. If handover is trigged, a handover event is trigged 612 wherein unverified cell ID is submitted in handover event report. A measurement configuration comprising information about unverified cell IDs is received 614 for detected pico cells, wherein the stored information of the pico cell list is used, as illustrated by the dash-double-dot-arrow. If feasible, handover is performed 616 to a pico cell. Thus, an event for trigging the first step of handover where the UE, when inter-frequency handover trigged also report detected but unverified detected cells, e.g. via RSRP. The network then determines pico cell detected and information about e.g. almost blank subframes (ABS) etc are provided to the UE at handover or after handover view RRC signaling.

Figure 7:
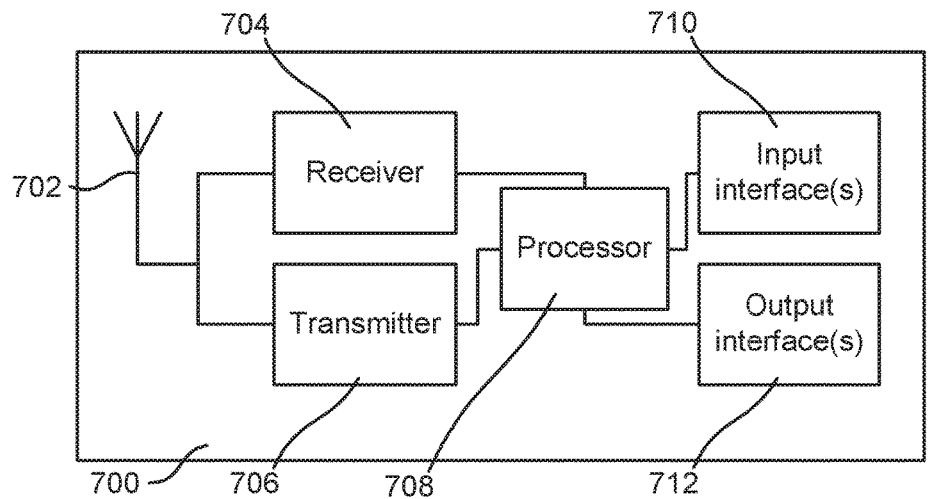
FIG. 7 is a block diagram schematically illustrating a UE according to an embodiment.

FIG. 7 is a block diagram schematically illustrating a UE 700 according to an embodiment. The UE comprises an antenna arrangement 702, a receiver 704 connected to the antenna arrangement 702, a transmitter 706 connected to the antenna arrangement 702, a processing element 708 which may comprise one or more circuits, one or more input interfaces 710 and one or more output interfaces 712. The interfaces 710, 712 can be user interfaces and/or signal interfaces, e.g. electrical or optical. The UE 700 is arranged to operate in a cellular communication network. In particular, by the processing element 708 being arranged to perform the embodiments demonstrated with reference to FIGS. 1 to 6, the UE 700 is capable of efficiently operating in a cellular communication network comprising macro and pico and even femto cells, i.e. a network that is popularly called a HetNet or a heterogeneous network which often indicates the use of multiple types of access nodes in a wireless network such as macro cells, pico cells, and/or femto cells in order to offer wireless coverage in an environment with a wide variety of wireless coverage zones, ranging from an open outdoor environment to office buildings, homes, and underground areas. The processing element 708 can also fulfill a multitude of tasks, ranging from signal processing to enable reception and transmission since it is connected to the receiver 704 and transmitter 706, executing applications, controlling the interfaces 710, 712, etc.

Figure 8:
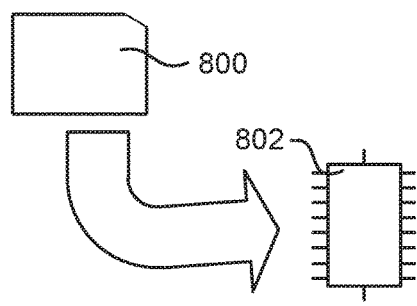
FIG. 8 schematically illustrates a computer-readable medium and a processing device.

The methods according to the present invention is suitable for implementation with aid of processing means, such as computers and/or processors, especially for the case where the processing element 708 demonstrated above comprises a processor handling handover Therefore, there is provided computer programs, comprising instructions arranged to cause the processing means, processor, or computer to perform the steps of any of the methods according to any of the embodiments described with reference to FIGS. 1 to 6 or any of the examples and embodiments disclosed herein. The computer programs preferably comprises program code which is stored on a computer readable medium 800, as illustrated in FIG. 8, which can be loaded and executed by a processing means, processor, or computer 802 to cause it to perform the methods, respectively, according to embodiments of the present invention, preferably as any of the embodiments described with reference to FIGS. 1 to 6 or any of the examples and embodiments disclosed herein. The computer 802 and computer program product 800 can be arranged to execute the program code sequentially where actions of the any of the methods are performed stepwise. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not to be construed as any direct illustration of the elements.

Although the description is given for UE, it should be understood by the skilled in the art that "UE" is a non-limiting term comprising any wireless device or node equipped with a radio interface allowing at least for receiving and measuring signals in DL. Some examples of UE in its general sense are PDA, laptop, mobile, sensor, fixed relay, mobile relay, a radio network node equipped with the UE-like interface (e.g., an LMU, a femto base station or a small base station using the terminal technology). A UE herein may comprise a UE (in its general sense) capable of operating or at least performing measurements in one or more frequencies, carrier frequencies, component carriers or frequency bands. It may be a "UE" operating in single- or multi-RAT or multi-standard mode (e.g., an example dual-mode UE may operate with any one or combination of WiFi and LTE).

A cell is associated with a radio node, where a radio node or radio network node or eNodeB used interchangeably in the invention description, comprises in a general sense any node transmitting radio signals in DL and/or receiving radio signals in UL. Some examples of radio network nodes are eNodeB, Node B, RNC, macro/micro/pico radio base station, home eNodeB, relay, repeater, sensor, transmitting-only radio nodes. A radio network node herein may comprise a radio node operating or at least performing measurements in one or more frequencies, carrier frequencies or frequency bands. It may be a radio node capable of CA. It may also be a single- or muti-RAT or multi-standard node, e.g., using the same or different base hand modules for different RATs.

Multiple serving cells are possible with carrier aggregation, so "a serving cell" is in general used throughout the description for CA and non-CA systems. With CA, primary cell (PCell) is one example of a serving cell, and another example is a secondary cell (SCell). For a UE in RRC_CONNECTED not configured with CA there is only one serving cell comprising of the primary cell (PCell). For a UE in RRC_CONNECTED configured with CA the term 'serving cells' is used to denote the set of one or more cells comprising of the primary cell and all secondary cells.

The term "network node" is a general term which may comprise, e.g., a radio network node or a core network node. Some examples of network nodes are MME, MDT node, eNodeB, SON node, etc.

The term "centralized network management node" or "coordinating node" used herein is a network node, which may also be a radio network node, which coordinates radio resources with one or more radio network nodes and/or UEs. Some examples of the coordinating node are network monitoring and configuration node, MME, OSS node, O&M, MDT node, SON node, positioning node, a gateway node such as Packet Data Network Gateway (P-GW) or Serving Gateway (S-GW) network node or femto gateway node, a macro node coordinating smaller radio nodes associated with it, etc.

A subframe may be LTE subframe or any time interval or time slot, which may be pre-defined.

The signaling described in the invention is either via direct links or logical links (e.g. via higher layer protocols and/or via one or more network nodes). For example, signaling from a coordinating node may pass another network node, e.g., a radio node.

The embodiments of the invention are not limited to LIE, but may apply with any Radio Access Network (RAN), single- or multi-RAT. Some other RAT examples are LTE-Advanced, UMTS, GSM, cdma2000, WiMAX, and WiFi, Embodiments described herein may be considered as independent embodiments or may be considered in any combination with each other to describe non-limiting examples of the current invention.

Though the description is provided for a verification step using measurement CRS, the invention may also apply for other physical signals used for verification.

Figure 14:
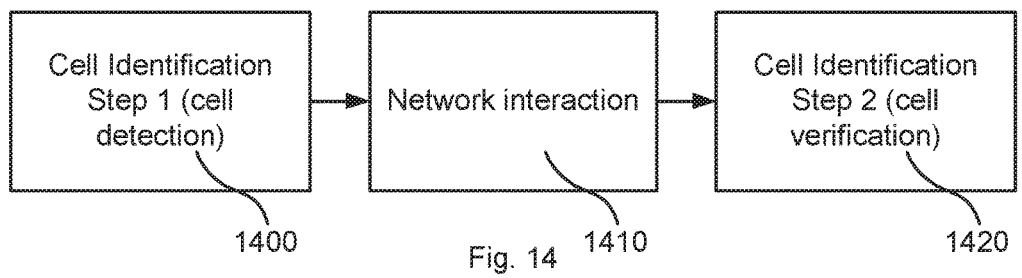
FIG. 14 schematically illustrates a basic flow of two-step cell identification with network interaction according to an embodiment.

According to the current invention, the two-step cell identification 1400, 1420 with network interaction 1410 may be illustrated at a high-level by the schematic diagram in FIG. 14.

The cell identification steps (1 and 2) 1400, 1420 are performed by the UE. The two cell identification steps may be any combination of one or two of: intra-frequency, inter-frequency, or inter-RAT. For example:
- inter-frequency (one of the steps) and intra-frequency (the other step),
- both steps are intra-frequency,
- both steps are inter-frequency.

Further, any of the two cell identification steps 1400, 1420 may or may no same as in the current standard. For example, Cell Identification Step 1 may be performed on signals different than PSS/SSS, or Cell Identification Step 2 may be performed on signals different than CRS or may even involve a measurement different from RSRP or a measurement which is not a power-based measurement (e.g., may be a timing measurement in contrary to RSRP or RSRQ or similar).

The network interaction 1410 involves the UE and at least one network node (e.g., a radio network node in general, eNodeB, positioning node, MDT node, SON node, coordinating node, etc.). The interaction 1410 may be initiated by either of the two sides, but more typically would be initiated by the UE. The network interaction 1410 may depend on the result of or simply follow the preceding step of Cell Identification Step 1. For example, the network interaction step 1410 may comprise any one or combination of:
- Cell change and/or carrier change in general (e.g., intra-frequency/inter-frequency/inter-RAT handover, PCell change on the same PCC, PCell change to a different frequency carrier or to a new PCC, SCell or SCC configuration/reconfiguration/activation/deactivation, etc.),
- The first step of the two-step handover,
- A report associated with the cell identification step 1 (e.g., an event report or cell detection result report),
- Requesting and/or receiving assistance data or measurement pattern which may be used for Cell Identification Step 2.

Figure 15:
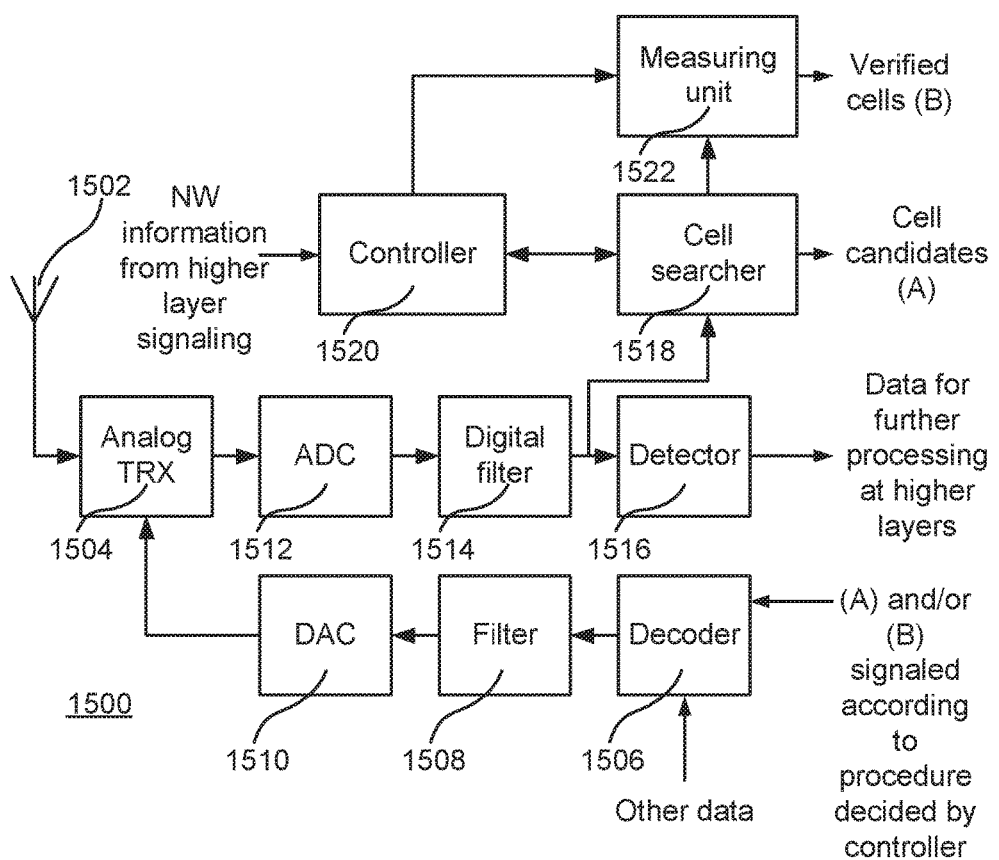
FIG. 15 is a block diagram schematically illustrating a UE according to an embodiment.

The basic embodiment of the current invention is that the UE starts identification 1400 of at least one cell before the network interaction 1410 occurs and continues identification 1420 of the at least one cell after the network interaction step 1410. Some of the advantages are faster and more resource-efficient cell identification, the possibility to interact 1410 with the network between the two steps 1400, 1420 of cell identification, the possibility of deciding on whether to perform the second cell identification step or not, etc. An example diagram of a UE apparatus 1500 performing cell identification is shown in FIG. 15, as well as in the schematic illustration in FIG. 7.

The UE 1500 comprises an antenna 1502 connected to an analog transceiver circuit 1504. Transmissions to be sent uplink to the cellular system, e.g. list of cell candidates (A) or verified cells (B), is provided to a decoder 1506 which decodes the information, and the information may be filtered in a filter 1508 before being converted to an analog signal by a digital-to-analog converter 1510. The analog signal is then provided to the transceiver 1504 to be transmitted.

Received signals are provided from the transceiver 1504 to an analog-to-digital converter 1512 for conversion into digital signals, which can be filtered by a digital filter 1514. The signal is then provided to a detector 1516 for extracting the received data, which is provided to higher layers for further processing. The signal is also provided to a cell searcher 1518 which searches for candidate cells as for example elucidated with reference to steps 202, 302,402, 502, 602 and 1400. The cell candidates (A) can then be stored, provided to a controller 1520 of the UE 1500, and/or provided to a measuring unit 1522 which makes measurements to verify one or more found cells. Here, the controller controls operation of the cell searcher 1518 and the measuring unit 1522, which can be based on network information from higher layer signalling, i.e. from the data decoded by the detector 1516 which have been processed to extract for example control information. The verified cells (B) are provided to further processing such as for deciding/performing/finishing related to a handover event.

The basic embodiment may imply any of the following:

Option 1: The UE postpones the Cell Identification Step 2 and continues it after the network interaction;

Option 2; There is a decision step (as will be disclosed below in more detail) preceding Cell Identification Step 1 and/or Cell Identification Step 2. In the second case, the decision step may precede the network interaction step, may be comprised in the network interaction step, or may follow the network interaction step. The output of the decision step is one of the following choices: perform conventional cell identification (without postponing Step 2 and with no network interaction step), performing Step 1, or performing Step 1 and Step 2 (see FIG. 14). The decision step may be performed
- by the UE (autonomously or by a pre-defined rule),
- by a network node, e.g., a radio network node or a core network node (MDT, positioning node, SON, coordinating node, etc.),
- jointly by or in coordination with UE and the network node; Option 3 (or 2a): The UE performs Cell Identification Step 1 and reports the result. Reporting of the cell identification result may be comprised in the network interaction step.

In this special embodiment the UE does not perform Step 2 or it may be not able to perform Step 2, i.e., there is no decision step which may dynamically decide execution of Step 2 but it is pre-programmed in the UE in a static way that Step 2 is not performed; in this special embodiment, performing Step 2 is a UE capability (e.g., low-cost devices may be not capable of performing Step 2). This embodiment may be viewed also as a pre-configured decision based on the UE capability to perform Step 2 in general or in combination with a certain condition (e.g. as demonstrated above).

The UE may also store the results of at least one of the cell identification steps, e.g., to store any of: radio signal samples, detected and/or verified PCI or a set of candidate PCIS, etc., in an internal or external memory. The stored results may be used to facilitate the on-going cell identification by the same UE, but may also be used for other purposes (see, e.g., below).

The UE may report the result of at least one of the cell identification steps to a network node or another UE (see, e.g., below).

In addition to the steps illustrated in FIG. 14 and also an optional step of decision making, there may also be a correction step, by which an event or action taken based on Cell Identification Step 1, may still be reverted, undone, or corrected (e.g., reselect the correct cell), in case Cell Identification Step 2 indicated erroneous result after Cell Identification Step 1. The network node and the UE should avoid or minimize the probability of the correction step. To avoid/minimize the probability, the UE or network node may use the collected statistics (see, e.g., below) or postpone the decision until the Step 2 is complete if it is decided to go for Step 2 too.

Here and in other embodiments of the invention, a result of two-step cell identification shall be understood as a result related to cell identification which is obtained during or after Cell Identification Step 1 or Cell Identification Step 2. Further, the cell identification result after Step 2 may comprise hereafter either the result of only Cell Identification Step 2 or the result of both cell identification steps.

According to an embodiment 1, there is provided Methods and Signaling Means for Reporting a Cell Identification Result with Two-Step Cell Identification with Network interaction The UE may report the result of at least one of the cell identification steps to another UE or a network node, where the receiving network node may be a radio node (e.g., a serving eNodeB or RNC) or a network node in general (e.g., positioning node, MDT node, SON node, etc.). Together with the result, the UE may also provide an indication on whether the result is the result after Step 1 or the result after Step 2; alternatively, different message types or different Information elements may be used for the results after the two different steps.

It is emphasized that the above allows also for reporting after the cell detection step (i.e., Cell Identification Step 1). In this case, the report may comprise, e.g., any one or combination of:
  At least one of the detected PCIs,
  A list of candidate PCIs after the detection step, where more than one candidate PCIs may be possible for detecting one cell,
  At least one of the detected PCIs from a certain list of PCIs, where the list may further comprise any of:
  a list provided by a network node prior the detection step (e.g., a mobility neighbor cell list or a list of cells in the assistance data received by the UE as assistance for cell detection, cell identification, performing UE measurements or in relation to measurement patterns),
  a set of PCIs that meet a certain condition, where the condition may be determined according to a pre-defined UE, provided by the network or autonomously determined by the UE; the condition may be, e.g.:
    PCIs for which transmissions of a known signal in time-frequency domain overlap with transmissions of a known signal from a serving cell (specific example: PCIs for which CRS are colliding with a serving cell CRS),
    PCIs that are not in a black cell list or any exclusion list.
  The number of detected cells,
  The number of candidate cells,
  An indication of an event associated with the detection (e.g., "detected/not detected").

Some examples of the reported information after verification (Cell Identification Step 2), where the result after verification may comprise either the result of the verification step only or the result of both cell identification steps, are:
  At least one of the identified PCIs,
  The number of identified PCIs,
  The number or rate of identified PCIs that passed verification, success or failure rate or similar.

A cell identification result may be reported by the source node e target node in different ways, e.g.:
  Upon receiving an explicit request from the target node (e.g., eNodeB requesting the UE to perform cell identification and/or send a result of cell identification in general or specifically after the first cell identification step and/or the second cell identification step),
  Upon receiving an explicit request from another node (e.g., eNodeB requesting the UE to perform cell identification and/or send the result to positioning node, or one eNodeB requesting UE to send the result to another eNodeB),
  Without receiving an explicit request from a node (e.g., without eNodeB requesting the UE to perform cell identification and/or send the result). In this case, the result may be sent, e.g.,
  Periodically,
  Triggered by a certain event, e.g., at a pre-defined occasion such as at initial setup, after a cell change, after a carrier change, when interference level drops below a certain level, when accessing a node, when setting up a service, when configuring a certain measurement, when receiving a measurement pattern, upon entering a certain activity state (e.g., non-DRX, CONNECTED, etc.), etc.,
  In response to a triggering condition. An example of the triggering condition may be based on a comparison of a signal strength level or signal quality level to a certain threshold, e.g., the serving cell quality dropped below a threshold or when the number of currently performed measurements exceeds a threshold. Other triggering condition examples may be related to determining harsh interference conditions, proximity of a transmitting node, when in cell range expansion zone, etc.

The reported result may be used by the receiving node as a conventional cell identification result or in any of the ways described above.

As has been briefly described above, there may be defined UE capability associated with the UE ability to perform Step 2. In specific non-limiting examples, the capability may be any one of:
  UE capability to support Cell Identification Step 1 only (i.e., not supporting Step 2),
  UE capability to support two-step cell identification as illustrated in FIG. 6, i.e., with a network interaction step between the two cell identification steps,
  UE capability to support two-step cell identification with two-step handover in heterogeneous deployments.

This UE capability may be associated with specific time-frequency resources, e.g., with subframes indicated by a measurement pattern such as a time-domain and/or frequency-domain measurement resource restriction pattern.

This capability may be signaled to a network upon a request, without a request on a. certain condition or event, or provided proactively. This UE capability may also be exchanged between network nodes, e.g., between two eNodeB via X2 interface in a handover-related message when the UE is handed over from one eNodeB to the other eNodeB.

According to an embodiment there is provided Using Cell Identification Result

A cell identification result, as defined above, may be stored by the and/or reported to another UE or network node (see, e.g., above).

In non-limiting examples, the cell identification result, stored or reported, may be used, by the source (UE) and/or target (UE or network node), for any one or combination of:

Deciding or assisting in a decision on whether to perform the conventional cell identification or follow cell identification described herein, Deciding or assisting in a decision on whether to continue with the Cell Identification Step 2, Configuring of Cell Identification Step 2 (e.g., configuring the type of verification measurement and/or how the measurement is to be performed, configuring a measurement pattern, etc.), Cell identification reporting configuration (e.g., configuration of an event or a triggering condition), Neighbor cell or assistance data build-up for cell identification or measurements (the measurements may or may not be related to the cell identification steps), for mobility purpose (when making or assisting in a handover decision; for two-step handover to facilitate eICIC. etc.), for tracking or positioning purpose (e.g., for proximity detection), for collecting cell identification or UE performance statistics (e.g., for MDT, to replace or complement expensive drive tests, etc.), for SON.

Any of the above may be used for/by the same UE which performs cell identification, but may also be used for other UEs (e.g., by a network node, by a coordinating node, by another UE, etc.).

Another embodiment of this part of the intention that the cell identification results described in this section (i.e. the result after Cell Identification Step 1 or the result after Cell Identification Step 2 further comprising either the result of only Step 2 or bother Step 1 and Step 2) may be managed differently from the conventional cell identification results, e.g., stored and/or post-processed differently. Further, the receiver of the result (UE or a network node) may be able to differentiate (see, e.g., above) between the conventional cell identification results and the cell identification results described herein.

Further advantage can be achieved through Collecting and Using Historical Data Related to Two-Step Cell Identification The UE may also collect and store statistics of the results of each of the two steps and/or the comparison result of the two steps. The statistics may comprise any one or combination of single metrics described above or an aggregation metric, e.g., failure rate, success rate, or a comparison result comprising a measure reflecting similarity of the two steps or reliability of the first step, etc. The collected results may also be stamped with time, date, cell identity, location area identification, etc.

This statistics may be used by the source UE or by the target (another UE or a network node), and some of the usage examples are as listed herein. For example, if the statistics indicates that Cell Identification Step 1 is typically sufficiently reliable in these conditions, there may be a decision to not perform Step 2.

The signaling means to the target for delivering the results for collecting the statistics or for delivering the statistics may be similar to those described above. The signaled information may be as described above or may also be a result f the comparison.

According to one embodiment there is provided Deciding on the Cell notification Step 2.

In this embodiment, the decision step briefly described above s described in further details by means of non-limiting examples.

More specifically, the decision step may comprise choosing one of the belt

Decision 1: conventional cell identification approach including verification (i.e., no network interaction step between the two cell identification steps), Decision 2: Performing only Cell Identification Step 1, Decision 3: Performing both Cell Identification Step 1 and Cell Identification Step 2 after network interaction.

Previously, there has been only one choice (Decision 1), so there was no need in a method for deciding among these options, Decision made by the UE may include that the UE makes a decision comprising selecting one of the three decision options listed above. Some example decision criteria may be any one or a combination of:

Cell type (e.g., for cell identification of a small cell for inter-frequency mobility purpose the new two-step cell identification with two-step handover may be desirable see below), Type of cell identification (e.g., intra-frequency, inter-frequency, inter-RAT; for example, Step 2 may be more needed for inter-frequency or inter-RAT), Purpose (e.g., performing Step 2 may have a lower priority when being performed for MDT and may be of a higher priority for mobility), UE activity state such as CONNECTED/IDLE, DRX/non-DRX, etc. (e.g., Step 2 may be less preferred in lower-activity states), UE capability to perform Step 2 (see, e.g., above, e.g. Option 3/2a,), Environment type (e.g., indoors, outdoors—it may be more difficult to detect and fewer cells may be seen indoors), Interference conditions and aggressor cells (e.g., high interference conditions and aggressor cell interference may motivate for Step 2), which may be obtained from other UE measurements and involve comparison of measurement value to a threshold (e.g., serving cell signal strength or signal quality is above a certain threshold may indicate a potentially high interference to neighbor cell signals), Channel characteristics and UE speed (e.g., detection may be more accurate on channels with less delay spread and lower UE speed), Availability of measurement pattern (e.g., time-domain measurement resource restriction pattern for neighbor cell measurements on a certain frequency(s) where cell identification is to be performed), UE power consumption and battery energy (at a lower battery level, Step 2 may be less preferable), Network synchronization (e.g., conventional cell identification may be preferable in an asynchronous network or in a low-loaded network or for UEs which are not in cell range expansion zone).

Based on decision criteria, the decision may be made by the UE in one or a combination of ways below:
- Autonomously (e.g., without network assistance or interaction with the network or other UE),
- According to a pre-defined rule (e.g., verifying whether a decision criteria meets a pre-defined condition(s) with respect to a pre-defined threshold),
- Based on the information or assistance received from the network or another UE.

An example of a combination of way for making the decision is "autonomously+pre-defined rule" or "using assistance+pre-defined rule".

The UE may directly or indirectly inform a network node (e.g., serving eNodeB) about the decision, e.g.,
- If the decision is to use the cell identification described herein, then a message type and/or an Information Element different from those used for the conventional cell identification is used for reporting the result;
- Further, if the decision is to continue with Step 2, then the UE may not report the result of Cell Identification Step 1, but may report the result of Cell Identification. Step 2;
- Otherwise, if the decision is to not continue with Step 2, then the UE may report the result of Cell Identification Step Decision made by a network node (e.g., eNodeB or a coordinating node) implies that the network node receives the result of Cell Identification Step 1, e.g., by signaling means described above.

Decision criteria examples are similar to those described for the decision made by UE (see above), provided that the corresponding information is available in the network node.

Upon making a decision, the network node informs the UE about whether the UE have to perform Cell Identification Step 2 or not. The network node (e.g., eNodeB or RNC) may inform the UE directly or indirectly, e.g., by
- sending an explicit indicator indicating the network node's decision,
- sending a request for performing or an indication of the need to perform cell identification according to the decision made,
- providing the information or assistance data necessary for performing the two-step cell identification or Cell Identification Step 2, etc.

According to an embodiment there is provided Two-Step Cell Identification for Enhanced Support of Inter-Frequency Measurements and Mobility in Heterogeneous networks.

In this embodiment, the two--step cell identification is further adapted for inter-frequency cell mobility in a heterogeneous network. The embodiment is described by giving a non-limiting example. In this specific example, the inter-frequency mobility is further comprising a two-step handover. Thus, the following steps are comprised in this example:

Step A1: Cell Identification Step 1 (of cell 3, both inter-frequency), may be performed together with cell identification of cell 2,
Step A2: [Optional] Store the result of Step A1,
Step A3: [Optional] Reporting result of Step A1 or an event associated with Step A1,
Step A4: HO1,
Step A5: [Optional] Decision step,
Step A6: [Optional] Cell Identification Step 2 (of cell3, intra-frequency), may be performed in restricted measurement pat e
Step A7: [Optional] HO2.

Previously, a two-step handover would require one complete cell identification prior HO1 and then another complete cell identification prior H2, which, given long time necessary for cell identification, may be very time- and power-consuming. Instead, Cell Identification Step 1 for cell 3 is performed prior HO1, e.g., together with cell identification of cell 2. Cell. identification of cell 2 may be performed, e.g., by any suitable approach or by only Cell Identification Step 1. Thus, in this part of the invention, cell identification of cell 3 is split into two steps with a network interaction step (HO1) in between. The second step may also be optional and may depend on the decision step. In this part of the invention, the procedures, information signaling, and methods related to two-step cell identification may be similar to those described above.

The UE may or may not need measurement in Step A1, e.g., the UE may be able to perform inter-frequency measurements without gaps in CA. Further, even if the UE needs measurement gaps in Step A1, the same gap may be used for cell 3 and cell 2 since they are on the same frequency. The same gap may be used both when the cells are synchronous or asynchronous, which is because a measurement gap may comprise up to 6 subframes (5 subframes of effective measurement time on inter-frequency), whilst the maximum subframe shift between two closest PSS/SSS subframe of cell 2 and PSS/SSS subframes of cell 3 is 3 subframes (PSS/SSS are transmitted in subframes 0 and 5 as described in the background section), i.e., one measurement gap can cover PSS/SSS subframes of both cells, even in an asynchronous network.

Another observation is that in a synchronous network, measurement patterns are useful e.g. for measurements performed on CRS signals the performance of which may be improved by low-interference subframes, and this measurement pattern may be available after HO1 but not before HO1. Advantages with the two-step cell identification in this example:
- There is no need in providing measurement resource restriction pattern in Step Al since the measurement pattern is not helpful for synchronization signals which have reuse-1 patter, (i.e., 100% load in a synchronous case).
- Not configuring measurement resource restriction pattern for inter-frequency cell identification allows to avoid aligning measurement gaps (if they have to be configured for the UE) with measurement restriction patterns which removes restrictions on the network.
- The existing requirements may be reused: In Step A1, legacy inter-frequency cell identification requirements (e.g., TS 36.133, Section 8.1.2.3) will determine the cell identification time period. In Step A6, the existing intra-frequency measurement requirements (e.g., TS 36.133, Section 8.1.2.2 for legacy requirements; Section 8.1.2.8, subclause 8.1.2.8.1.1 for non-DRX and Table 8.1.2.8.1.2-2 for DRX with restricted measurement requirements) may be reused.

Figure 16:
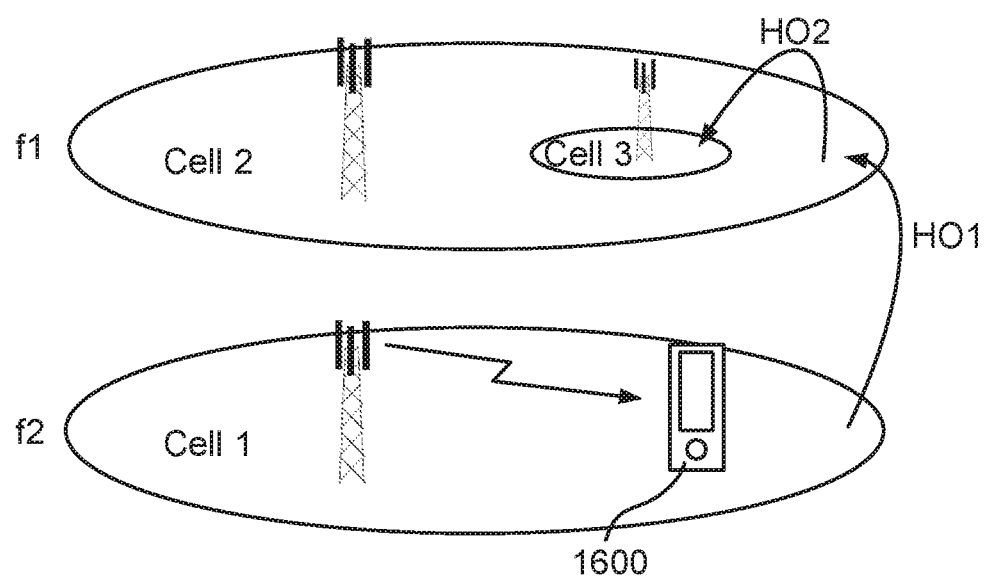
FIG. 16 illustrates a two-step handover scenario in a heterogeneous network.

The example is described in further detail below. When a UE needs to perform cell identification in high-interference conditions on another frequency, the UE may need to be configured with a measurement pattern for that frequency, e.g., a time-domain measurement restriction pattern for neighbour cell measurements on that frequency. The UE maybe, however, in a cell which is not aware of the measurement pattern or low-interference time-frequency resources (e.g., subframes and/or subbands) for which such a measurement pattern could be configured. Such situation may occur, e.g., when a UE is associated to or needs to identify a small cell or any base station which does not have X2 interface with at least some of its neighbours. One possibility in such case is to perform a two-step handover: handover to one (intermediate) cell followed up with another handover from the intermediate cell to the target cell. An example is illustrated in FIG. 16, where cell 1 on carrier frequency (or component carrier) f2 is the original to which the UE 1600 is associated, cell 2 on carrier frequency (or component carrier) f1 is a macro cell which is an intermediate cell, and cell 3 is the target cell which is on the same frequency as macro cell 2. In FIG. 16, the first HO step and the second HO step are indicated by HO1 and HO2, respectively. As one can see, HO1 is inter-frequency and HO2 is intra-frequency.

According to an embodiment there is provided Two-Step Cell Identification under Cell Change or Frequency Carrier/Component Carrier Change.

The two-step cell identification concept described above and embodiments described above may also apply when the network interaction comprises a cell change and/or frequency carrier (or carrier component) change. One example of a cell change is handover. Another example is carrier switching or reconfiguration (e.g., PCell switching or SCell reconfiguration or deactivation with CA).

More specifically, in this part of embodiments of the invention, the UE is adapted to either report Cell Identification Step I result or to continue cell identification after a cell and/or frequency change. The total cell identification period may comprise T1 or T2, which may be calculated as follows (square brackets indicates "optional"):

> T1=Time for Cell Identification Step 1+Reporting delay after Cell Identification Step 1+[Some margin].

> T2=Time for Cell Identification Step 1+[Reporting delay after Cell Identification Step 1]+Time for network interaction (e.g., HO interruption, HO delay, or carrier switching or reconfiguration time; may also depend on the number of network interaction events, e.g., number of cell changes and/or carrier switches) Time for Cell Identification Step 2+[Reporting delay after Cell Identification Step 2]+[Some margin].

From the disclosure above, numerous of advantages of different features and approaches are readily understood. Among those, some are particularly important, such as
  Faster and more resource-efficient cell identification
  Possibility to choose to not perform verification step and report the result cif cell detection,
  Methods for using the information obtained from two-step cell identification, Further, abbreviations are explained as they occur. However, for the sake of facilitating for the reader, they are listed below:
3GPP 3rd Generation Partnership Project
ABS Almost Blank Subframe
BS Base Station
CRS Cell-specific Reference Signal
eICIC enhanced ICIC
eNodeB evolved Node B
ICIC Inter-Cell Interference Coordination
LTE Long-Term Evolution
PCI Physical Cell Identity
RAT Radio Access Technology
RRC Radio Resource Control
SFN System Frame Number
SINR Signal-to-Interference Ratio
SRS Sounding Reference Signal
UE User Equipment
UMTS Universal Mobile Telecommunications System According to one embodiment, there is provided a method of handover, for a UE, to a first cell, wherein the first cell operates on a first frequency, from a second cell, wherein the second cell operates on a second frequency different form the first frequency. The method comprises performing cell detection on the first frequency while the UE is associated with the second cell on the second frequency; detecting at least one cell identification, ID, candidate on the first frequency; determining whether verification of cell ID is to be done prior or after a predetermined event has occurred; and if it is determined that verification is to be done after the predetermined event, postponing the verification and performing the verification after the predetermined event has occurred.

The predetermined event may be any of handover, carrier change, primary carrier change, and reception of a measurement pattern.

The method may further comprise reporting an event comprising sending a list of cells, wherein the list comprises the at least one cell ID candidate.

The UE may be in a cell expansion zone of the second cell.

The performing of the verification may include an intra-frequency measurement.

The measurements may be on the first frequency and may be performed in selected subframes arranged for low interference conditions.

The first cell may be a first pico cell associated with a first macro cell, wherein the first pico cell and the first macro cell operate on the first frequency.

The second cell may be a second pico cell associated with a second macro cell, wherein the second pico cell and the second macro cell operate on the second frequency.

According to one embodiment, there is provided a method of cell identification, by a user equipment, UE, wherein the method comprises
  performing a first cell identification step consisting of cell detection;
  performing at least one action associated with network interaction; and
  if the first cell detection step and the at least one action associated with network interaction allows or requires, performing a second cell identification step including verification of a cell detected by the first cell identification step.

The method of may further comprise performing the second cell identification step after the at least one action.

The action may be reporting a result obtained in the first cell identification step or an event associated with the result of the first cell identification step.

The network interaction may be any of: handover, cell change, carrier change or component carrier reconfiguration.

The method may further comprise performing a step of deciding whether to proceed to the second cell identification step, wherein the step of deciding preceding the network interaction step.

According to one embodiment, there is provided a communication apparatus suitable for operating in a cellular communication network, wherein the apparatus is arranged to perform the methods.

According to a one embodiment, there is provided a computer program comprising instructions which, when executed on a processor of a communication apparatus, causes the communication apparatus to perform the methods.

What is claimed is:

1. A method of cell detection, for a user equipment (UE) wherein the method comprises
    performing a cell search by receiving radio signals and searching for signals with a specific signature known to the UE, to provide cell candidates;
    detecting at least one cell identity (ID) candidate from the radio signals; and
    determining whether verification of the at least one cell ID candidate, using a measurement on a physical signal used for verification, is to be done prior or after a predetermined event has occurred,
    wherein if it is determined that verification is to be done prior to the predetermined event, performing the signal verification measurements for the detected cell ID and reporting the signal verification measurements for the detected cell ID,
    wherein if it is determined that verification is to be done after the predetermined event, postponing the verification and performing the verification after the predetermined event has occurred,
    wherein the predetermined event is any of handover, carrier change, primary carrier change, and reception of a measurement pattern from a network node, the detection is of a first cell, the first cell operates on a first frequency, the UE is served by a second cell, the second cell operates on a second frequency different from the first frequency, and
    the performing of cell search is on the first frequency while the UE is served by the second cell on the second frequency and the detecting of the at least one cell ID candidate is made on the first frequency.

2. The method according to claim 1, further comprising reporting an event comprising sending a list of cells, wherein the list comprises the at least one cell ID candidate.

3. The method according to claim 1, wherein the UE is in a cell extension zone of the cell serving the UE.

4. The method according to claim 1, wherein the performing of the verification includes an intra-frequency measurement.

5. The method according to claim 1, wherein the predetermined event comprises reception of a measurement pattern, the performing of the verification includes an intra-frequency measurement, and the measurements are on the first frequency and are performed in selected subframes in the received measurement pattern.

6. The method according to claim 1, wherein the first cell is a first pico cell having a coverage area in common with at least a part of a coverage area of a first macro cell, wherein the first pico cell and the first macro cell operate on the first frequency.

7. The method according to claim 6, wherein the second cell is a second pico cell having a coverage area in common with at least a part of a coverage area of a second macro cell, wherein the second pico cell and the second macro cell operate on the second frequency.

8. The method according to claim 1, wherein the detection of the at least one cell ID candidate is based on known secondary synchronization signal, SSS, sequences and on known primary synchronization signal, PSS, sequences.

9. The method according to claim 8, wherein the detection of the at least one cell ID candidate comprises
    determining cell identity group based on known secondary synchronization signal (SSS) sequences; and
    determining identity within the group based on known primary synchronization signal (PSS) sequences.

10. The method according to claim 1, wherein the verification comprises measuring cell-specific reference signals (CRS).

11. The method according to claim 1, in case the predetermined event comprises handover of the UE from the second cell to the first cell or another cell, the method includes performing the handover.

12. The method of claim 11, wherein performing the handover comprises reporting a handover event to a base station operating the second cell after verification of the cell ID candidate, receiving a handover instruction from the base station, and making handover according to the handover instruction.

13. The method of claim 12, wherein the handover instruction includes instructions to make handover to a third cell operating on the first frequency.

14. The method of claim 11, wherein performing the handover comprises initiating handover upon a handover event prior verification of the cell ID candidate and performing the verification after initiating the handover.

15. The method of claim 14, wherein the initiating of handover comprises transmitting a handover report including an unverified cell ID candidate.

16. A communication apparatus configured for operation in a cellular communication network, wherein the apparatus is further configured to:
    perform cell search by receiving radio signals and searching for signals with a specific signature known to the apparatus, to provide cell candidates;
    detect at least one cell identity (ID) candidate from the radio signals; and
    determine whether verification of the at least one cell ID candidate using a measurement on a physical signal used for verification, is to be done prior or after a predetermined event has occurred,
    perform the verification, responsive to determining that the verification is to be done prior to the predetermined event, or postpone the verification and perform the verification after the predetermined event has occurred, responsive to determining that verification is to be done after the predetermined event,
    wherein the predetermined event is any of handover, carrier change, primary carrier change, and reception of a measurement pattern from a network node, the detection is of a first cell, the first cell operates on a first frequency, the apparatus is served by a second cell, the second cell operates on a second frequency different from the first frequency, and
    wherein the apparatus performs the cell search on the first frequency while the apparatus is served by the second cell on the second frequency, and wherein the apparatus detects the at least one cell ID candidate on the first frequency.

17. The communication apparatus according to claim 16, wherein the communication apparatus is configured to perform handover from the second cell to a first cell.

* * * * *